United States Patent
Kozek et al.

(10) Patent No.: US 7,782,889 B2
(45) Date of Patent: Aug. 24, 2010

(54) METHOD FOR REGULATING THE TRANSMISSION PARAMETERS OF BROADBAND TRANSMISSION CHANNELS ASSEMBLED TO FORM A GROUP

(75) Inventors: Werner Kozek, Vienna (AT); Fauaz Labadi, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1170 days.

(21) Appl. No.: 10/574,336

(22) PCT Filed: Sep. 30, 2004

(86) PCT No.: PCT/EP2004/052375

§ 371 (c)(1),
(2), (4) Date: Mar. 30, 2006

(87) PCT Pub. No.: WO2005/034459

PCT Pub. Date: Apr. 14, 2005

(65) Prior Publication Data

US 2008/0232394 A1    Sep. 25, 2008

(30) Foreign Application Priority Data

Sep. 30, 2003   (DE) .................. 103 45 541

(51) Int. Cl.
*H04L 12/28* (2006.01)
(52) U.S. Cl. .................. 370/431; 370/230
(58) Field of Classification Search ......... 370/229–235, 370/431–445, 465
See application file for complete search history.

(56) References Cited

U.S. PATENT DOCUMENTS

| 6,317,495 | B1 | 11/2001 | Gaikwad et al. |
| 6,374,288 | B1 | 4/2002 | Bhagavath et al. |
| 7,499,453 | B2 * | 3/2009 | Carlson et al. ............ 370/395.2 |
| 2002/0041566 | A1 | 4/2002 | Yang et al. |
| 2002/0059170 | A1 * | 5/2002 | Vange ............................ 707/1 |
| 2003/0099200 | A1 | 5/2003 | Kiremidjian et al. |
| 2004/0052273 | A1 * | 3/2004 | Karaoguz et al. ............ 370/465 |

FOREIGN PATENT DOCUMENTS

| DE | 100 01 150 | 7/2001 |
| EP | 1 037 426 A1 | 9/2000 |
| WO | WO 00/51303 | 8/2000 |
| WO | WO 02/100008 A1 | 12/2002 |

\* cited by examiner

*Primary Examiner*—Phuc H Tran
(74) *Attorney, Agent, or Firm*—Laurence A. Greenberg; Werner H. Stemer; Ralph E. Locher

(57) ABSTRACT

The invention relates to a novel algebraic method wherein sub-groups of subscribers that spectrally influence each other, in a group of broadband subscriber connections or transmission channels connected to an intelligent network node in a star-shaped manner are classified by observing status variations in operation or in test phases of the individual transmissions, and the spectral influence relation or interference relation is identified with or without using specific test signals during the operation of the network node, without interrupting the data transmissions. The fundamental parameters of the data transmission methods of all of the connected subscribers are optimized from the information obtained in this way, for maximum operator use.

18 Claims, 1 Drawing Sheet

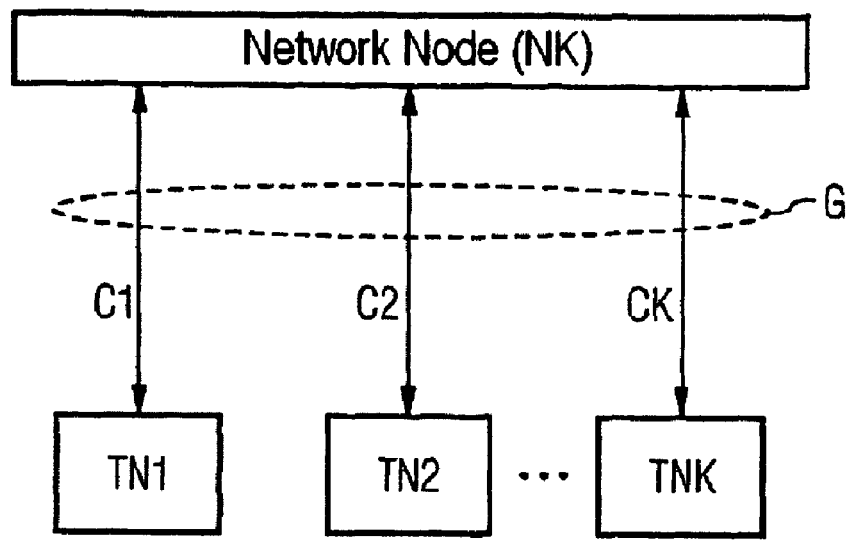
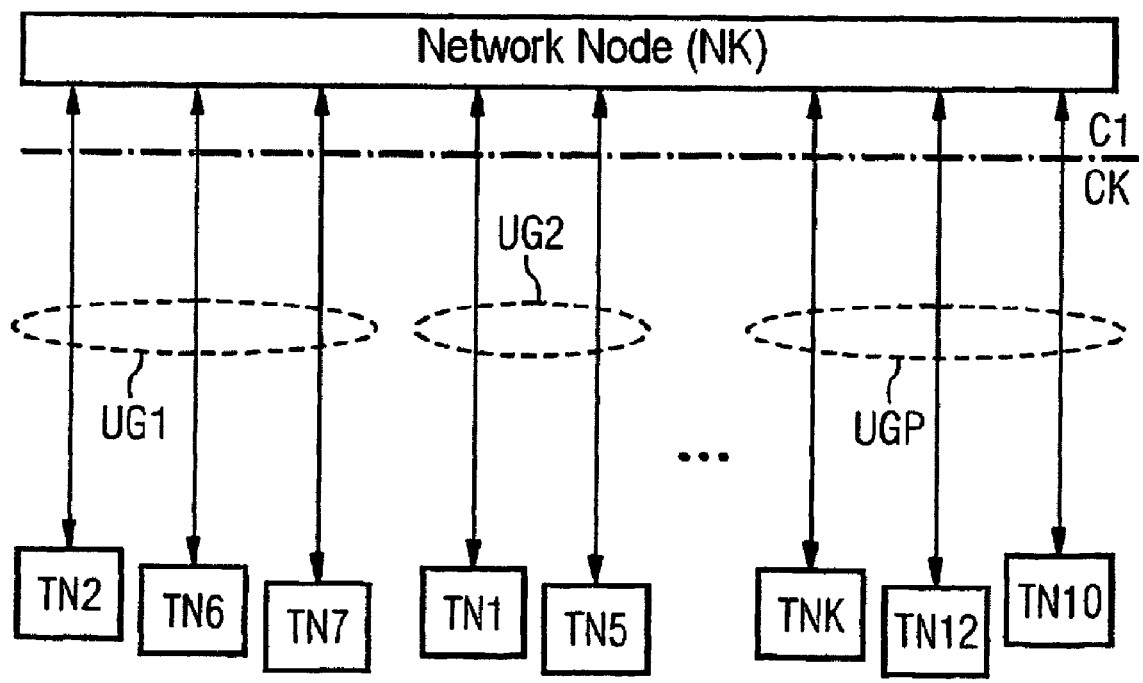

METHOD FOR REGULATING THE TRANSMISSION PARAMETERS OF BROADBAND TRANSMISSION CHANNELS ASSEMBLED TO FORM A GROUP

CROSS REFERENCE TO RELATED APPLICATION

This application is the US National Stage of International Application No. PCT/EP2004/052375, filed Sep. 30, 2004 and claims the benefit thereof. The International Application claims the benefit of German Patent application No. 10345541.8 DE filed Sep. 30, 2003, both of the applications are incorporated by reference herein in their entirety.

FIELD OF THE INVENTION

The invention relates to a method for setting the transmission parameters of transmission channels that are combined in a group, wherein transmission parameters are set for each transmission channel as a function of the determined transmission characteristics of the respective transmission channel and an assigned service, with the transmission channels in each case being assigned one of at least two services having different value ratings, and wherein the transmission channels of the group can influence one another by spectral interference.

BACKGROUND OF THE INVENTION

In the modern-day broadband access methods for subscriber line units of the subscriber line of the classical telephone system (xDSL services), connected via coaxial cable (CATV), via broadband radio services (WLAN, UMTS) or satellite communication, a star structure is always present. As a result of the associated concentration of subscriber lines or groups of transmission channels with a plurality of subscribers, the latter disadvantageously affect one another due to spectral interference, in particular in the environment of an intelligent network node which connects the subscriber line units to the backbone of the internet.

Owing to the increasing economic importance of the broadband access methods, numerous methods for improving the attainable transmission speed or data rate of all subscribers have been proposed.

The methods can be subdivided as follows:
A) Algorithms for multiuser detection: The bit sequences of the mutually influencing message transmissions are detected collectively, with the crosstalk relationships being determined simultaneously; see "Multiuser Detection, S. Verdu, Cambridge University Press, London, New York, 1998". Algorithms of this kind are considered in the UMTS standardization process. As a precondition these algorithms require the message transmissions of all the subscribers involved to be in strict clock-controlled synchronism. This clock synchronicity is categorically not given for xDSL data transmissions and also cannot be implemented technically without considerable changes to the standardized methods and consequently to the hardware equipment used at the subscriber premises and in the exchange (office).
B) MIMO signal processing methods: MIMO systems are understood to mean the mathematical theory for handling systems with vector-value inputs and outputs. MIMO signal processing methods are suitable for improving the aggregate bit rate of a plurality of message transmissions exerting a spectral influence on one another, although a prerequisite is strict clock synchronicity and frame synchronicity of all message transmissions. For the reasons cited in 1.), therefore, the use of MIMO signal processing algorithms such as "MIMO systems in the subscriber-line network, G. Tauböck, W. Henkel in 5th International OFDM Workshop 2000, Hamburg" is not realizable in practice at the present time.
C) Vector modulation methods: Closely related to 2.) are what are referred to as vector modulation methods, described in "Vectored Transmission for Digital Subscriber Line Systems", G. Ginis and J. Cioffi, published in IEEE Journal Selected Areas of Communications Vol. 20, Issue 5, pp. 1085-1104, June 2002. A significant difference is the a posteriori adaptation of the modulation signal of the individual message transmission systems to the crosstalk transmission functions. As with 2.), strict frame synchronicity and hence clock synchronization of all the modems involved is a precondition for the use of vector modulation methods.
D) Spectrum management methods: As described in "Dynamic Spectrum Management for Next-Generation DSL Systems", K.-B. Song, S.-T. Chung, G. Ginis, J. M. Cioffi, the aggregate bit rate of all subscribers of a cable group can be maximized by suitable distribution of the spectral power density of the individual subscribers.

A common feature of all the methods described in the foregoing is that the crosstalk relationships have already been determined at the time of activation of the respective subscriber lines or transmission channels on the subscriber lines.

SUMMARY OF THE INVENTION

The object underlying the invention is to improve the known methods in terms of the requirements of the operators of the subscriber lines. The object is achieved proceeding from the method for setting the transmission parameters of transmission channels combined in a group according to the features of the preamble of the claims and by their characterizing features.

The essential aspect of the method according to the invention is to be seen in the fact that the influencing relationships between the transmission channels can be identified by continuous determination of the spectral interference in the transmission channels and of the status changes of the transmission channels and that the transmission parameters of the transmission channels can be optimized as a function of the identified influencing relationships and the value rating of their respective services. A significant advantage of the method according to the invention is to be seen in the fact that the channel parameters are tuned, not to a maximum sum of the transmission speeds or bit rates of a group of transmission channels or of a group of lines, but to the maintaining, as far as possible, of the transmission speed of the transmission channels with services of a high value rating. High value ratings are exhibited, for example, by transmission channels of a group of transmission channels which are particularly attractive economically, i.e. profitable, for an operator. In this case it is often necessary to guarantee transmission speeds even given strong interferences within a group of transmission channels or a group of lines. With bidirectional transmission methods, the two transmission directions are advantageously handled as separate unidirectional abstract transmission channels so that the self-crosstalk between the different transmission directions is also registered and handled mathematically accordingly.

According to an advantageous embodiment of the invention, subgroups of transmission channels are classified as a function of the influencing relationships, with the influencing relationships, i.e. which transmission channels exert a spectral influence on which other transmission channels, being identified and the transmission channels being classified into subgroups by means of an algebraic method based on binary state vectors. This measure serves above all to reduce the time required—i.e. the computational overhead—for the implementation of the method according to the invention, in particular of the optimization method used.

According to a further advantageous embodiment of the invention, the status changes in the case of transmission channels operating according to the asynchronous transfer mode are represented by the determining of idle cells in a predefined time period or a predefined number. After status changes in broadband transmission channels, an initialization procedure determining the transmission parameters is initiated in the broadband transmission equipments assigned to the transmission channels and the spectral influence is determined from the transmission parameters. This embodiment of the invention can be implemented particularly economically, as existing components can be integrated for the transmission of cells in the asynchronous transfer mode—for example integrated circuits or broadband xdsl modems.

Advantageously the optimized transmission parameters are set in the transmission equipments for the respective transmission channels during the initialization procedure. In this case functions also present in the transmission equipments—for example broadband xdsl modems—can be used as well, as a result of which an economical solution is achieved.

BRIEF DESCRIPTION OF THE DRAWINGS

The method and communication equipment according to the invention will be explained below with reference to two drawings.

FIG. 1 provides the exemplary embodiment of the invention, and

FIG. 2 illustrates a possible classification of the subgroups.

DETAILED DESCRIPTION OF THE INVENTION

For the exemplary embodiment it is assumed—see FIG. 1—that a plurality of subscribers TN1 . . . TK are connected to a network node NK via a transmission channel C1 . . . CK in each case, the transmission channels C1 . . . CK being represented by broadband subscriber transmission channels. According to the invention the subscribers TN1 . . . TNK or, as the case may be, transmission channels C1 . . . CK connected to the network node NK represent a group of transmission channels. The broadband subscriber transmission channels are implemented for example by means of xDSL transmission channels, with the OFDM transmission method or the DMT transmission method advantageously being used as the transmission method. The network node NK can be implemented for example by means of a DSLAM (Digital Subscriber Line Access Multiplexer) or by means of a multi-DSLAM host computer which controls a plurality of DSLAMs.

With a large number of subscribers TN1 . . . TNK as is the case, say, with broadband subscriber lines connected via the traditional telephone network, a classification into groups or concentrations of subscribers exerting mutual influence proves advantageous. The group affiliation can be described in formal mathematical terms via a binary matrix $G(k,l)$ (in this case both indices run through the number of all subscribers) such that. $G(k,l)=1$ is set if the subscriber $k$ significantly influences the subscriber $l$ (and vice versa) or that $G(k,l)=0$ is set if there is no significant influencing present between subscriber k and subscriber l.

In the following it is explained by way of example how, by ongoing observation or determination of status changes of the transmission links or of occurring faults, a consistent estimated value of the group matrix $G(k,l)$ is determined. In the following let n be a time index of a time interval of all ongoing observations of status changes at a communication equipment—for example a network node DSLAM. Furthermore let $t_n(k)$ be a binary cause vector of the activation and deactivation operations described as follows: $t_n(k)=1$ if the k-th subscriber has been connected or disconnected during the observation interval and $t_n(k)=0$ if there has been no change in the operating status of the k-th subscriber in the observation interval. Analogously, let a binary effect vector $r_n(k)$ be defined as follows: $r_n(k)=1$ if the k-th transmission is significantly disrupted (i.e. fault lies above a threshold value that is to be defined) or $r_n(k)=0$ if the k-th transmission experiences no significant disruptions. In the following let all operations be given in the finite body GF(2). If the binary auxiliary matrices $X(k,l)$ and $Y(k,l)$ are defined by the two iteration rules:

$$X_{n+1}(k,l)=X_n(k,l)(t(l)t(k)+t^{-1}(k)),$$

$$Y_{n+1}(k,l)=Y_n(k,l)(r(l)t(k)+t^{-1}(k)),$$

The following iteration results for the trunk group matrix: $G_{n+1}=G_n+Y_nY_n^{-1}+G_n \circ Y_nX_n^{-1}$, where ○ stands for the Hadamard product of matrices. The start value for the iterations is $G_0(k,l)=0$, $X_0(k,l)=1$ and $Y_0(k,l)=1$.

In the identification of the crosstalk transmission function within a trunk group it is not possible to build on existing methods because, as already mentioned, all concepts described in the literature are based on frame synchronicity.

A novel concept for non-coherent identification of a MIMO system shall therefore be described below. The description of all the physical parameters involved takes place exclusively in the frequency domain, with the frequency axis being subdivided into sufficient small intervals. With multi-carrier modulation systems such as OFDM or DMT, the subdivision of the frequency axis defined by the standard is sufficient; with single-carrier systems, the spectral representations can be computed without difficulty by means of discrete Fourier transformation, advantageously by means of fast Fourier transformation algorithms.

As fine a resolution of the frequency axis as possible is advantageous, but the increasing computing overhead must also be taken into account, i.e. a typical length of M=128 proves sufficient. If n is now the index, already described above, of the observation interval in the network node or in the DSLAM, l the subscriber index within the trunk group and m the frequency index (0<m<M), then an auxiliary matrix ("power excitation matrix") can advantageously be defined by means of these indices by way of the changes in time in the transmit power density spectrum of the l-th subscriber $S_l(n,m)$ as a function of the time index:

$$X_n(l,m)=S_l(n+1,m)-S_l(n,m)$$

Analogously to the power excitation matrix let an incremental noise power matrix $Y_n(l,m)$ be defined by means of the corresponding change in time of the spectrally discretized noise power density $N_l(n,m)$:

$$Y_n(l,m)=N_l(n+1,m)-N_l(n,m)$$

There then results a transmission matrix $H_n(k,l)$ characterizing the interference interaction between k-th and l-th subscriber by matrix multiplication of Yn and $X_n^{-1}$ of the pseudo inverses of $X_n$:

$$H_n(k, l) = \sum_{p=0}^{M} Y_n(k, p) X_n^{-1}(p, l).$$

The transmission matrix $H_n(k,l)$ is therefore a measure for the reciprocal interference influence between subscriber k and subscriber l in the frequency domain with the index n. In order to optimize the operator benefits the aim is now to protect in particular such subscribers with a high tariff class from crosstalk interferences. In order to take account of this circumstance let a weighted aggregate transmission function $H_{agg,k}(n)$ of the k-th subscriber therefore be defined such that the interference entries with regard to all other subscribers are weighted with their value rating $p_l$:

$$H_{agg,k}(n) = \sum_{l=0}^{M} p_l H_n(k, l).$$

The aggregate transmission function $H_{agg,k}(n)$ thus defined now provides a penalty function relevant to the operator of the network node in the implementation of optimization algorithms for rate or power allocations as described in the literature; see, for example, D. Luenberger "Optimization by Vector Space Methods", John Wiley & Sons, 1969. A simplified iterative procedure in the connection of a new subscriber would be possible through the successive increasing of the bit rate during a test phase, where it ensured by minimization of $H_{agg,k}(n)$ that the increase in the bit rate is not achieved at the expense of already existing higher-value services.

With DMT-based transmission methods this means that what are referred to as the bit-loading algorithms for the distribution of the bits via the carrier index are to be extended by the supplementary condition of a minimization of $H_{agg,k}(n)$ in order to achieve the maximum operator benefit. The only supplementary condition of this kind to date is the conformance with the standardized spectral mask.

FIG. 2 shows by way of example a possible classification of subgroups UG1 . . . UGP according to the previously described determination method, with the classification being determined as a function of the established spectral interferences between the transmission channels C1 . . . CK and the status changes of the transmission channels C1 . . . CK.

The method according to the invention is not only applicable to OFDM or DMT transmission methods, but can be used in a plurality of wired and wireless communication equipments in communication networks in which a mutual influencing of the transmission channels takes place and whose channel parameters or whose transmission resources are to be optimized as a function of services with different value ratings in particular for the operators of communication networks—for example for transmission channels in a wireless LAN (WLAN).

The invention claimed is:

1. A method for setting the transmission parameters of transmission channels combined in a group, comprising:

setting transmission parameters for each transmission channel as a function of the determined transmission characteristics of the respective transmission channel and of an assigned service, with the transmission channels in each case being assigned one of at least two services having different value ratings;

mutually influencing the transmission channels of the group through spectral interference;

identifying the influencing relationships between the transmission channels by continual determination of the spectral interference in the transmission channels and of the status changes of the transmission channels; and optimizing the transmission parameters of the transmission channels as a function of the identified influencing relationships and the value rating of their respective services.

2. The method as claimed in claim 1, wherein a plurality of subgroups of transmission channels are classified as a function of the influencing relationships.

3. The method as claimed in claim 2, wherein the group or subgroups of transmission channels are implemented in a trunk group or a radio area or at a node of a wired or wireless communication network.

4. The method as claimed in claim 1, wherein the influencing relationships exert a spectral influence on which other transmission channels are identified and the transmission channels are classified into subgroups by means of an algebraic method based on binary state vectors.

5. The method as claimed in claim 1, wherein the transmission parameters of the transmission channels are continually optimized at regular or predefinable time intervals or upon status changes, as a function of the identified influencing relationships and the value rating of their respective services.

6. The method as claimed in claim 1, wherein the value rating of the services is dependent on charges to be achieved with the respective services or on a guaranteed transmission quality or guaranteed transmission capacity or a guaranteed transmission speed.

7. The method as claimed in one claim 1, wherein the spectral influencing is determined by continual measurement of the noise/useful signal ratio in the transmission channels.

8. The method as claimed in claim 1, wherein the status changes of the transmission channels are represented by a change from an active to an inactive state or from an inactive to an active state or from an active to an error state or from an inactive to an error state or from an error state to an active state or from an error state to an inactive state.

9. The method as claimed in claim 1, wherein the transmission channels operating according to the asynchronous transfer mode, a status change is represented by the determination of idle cells in a predefined time period or a predefined number.

10. The method as claimed in claim 9, wherein after status changes in broadband transmission channels an initialization procedure determining the transmission parameters is initiated in the broadband transmission equipments assigned to the transmission channels and the spectral influence is determined from the transmission parameters.

11. The method as claimed in claim 10, wherein the optimized transmission parameters are set for the respective transmission channels in the transmission equipment in the course of the initialization procedure.

12. The method as claimed in claim 1, wherein a unidirectional transmission channel is considered as one transmission channel and a bidirectional transmission channel is considered as two transmission channels.

13. The method as claimed in claim 1, wherein the spectral interferences are measured in the transmission channels via which no transmission method-specific signals are transmitted, and said spectral interferences are included in the optimization of the transmission parameters.

14. The method as claimed in claim 1, wherein the transmission parameters are represented by the transmit power distribution in the respective transmission channel.

15. The method as claimed in claim 14, wherein the transmission channels physically hierarchically network-structured at a node are mapped onto a logically star-shaped structure, with lower-ranking nodes being controlled by the central node.

16. The method as claimed in claim 1, wherein the transmission parameters of the transmission channels of a group or subgroup of transmission channels are optimized as a function of the identified influencing relationships and the value rating of their respective services with the aid of a mathematical optimization method.

17. The method as claimed in claim 1, wherein the transmission meters of the transmission channels are in each case referred to an OFDM or a DMT transmission method.

18. A communication equipment for setting the transmission parameters for transmission channels combined into a group, comprising:

a plurality of transmission equipments connected to the communication equipment, in each case terminating the transmission channels, for determining the transmission characteristics of the respective transmission channel and for recording the transmission characteristics in the communication equipment; and a device for setting the transmission parameters as a function of the determined transmission characteristics of the respective transmission channel and of an assigned service, with the transmission channels in each case being assigned one of at least two different value ratings, and the transmission channels of the group being able to exert a mutual influence through spectral interference, wherein the communication equipment is embodied for recording the spectral influence in the transmission channels and the status changes of the transmission channels and for identifying the influencing relationships between the transmission channels, and an optimization routine is provided for optimizing the transmission parameters of the transmission channels as a function of the identified influencing relationships and the value rating of their respective services.

* * * * *